US009833891B2

(12) United States Patent
Patterson

(10) Patent No.: US 9,833,891 B2
(45) Date of Patent: Dec. 5, 2017

(54) ANTI-TORQUEING DYNAMIC ARRESTING MECHANISM

(71) Applicant: James Patterson, Katy, TX (US)

(72) Inventor: James Patterson, Katy, TX (US)

( * ) Notice: Subject to any disclaimer, the term of this patent is extended or adjusted under 35 U.S.C. 154(b) by 412 days.

(21) Appl. No.: 14/628,448

(22) Filed: Feb. 23, 2015

(65) Prior Publication Data

US 2016/0243692 A1    Aug. 25, 2016

(51) Int. Cl.
    *B25F 5/00*     (2006.01)
    *H02H 7/085*    (2006.01)
(52) U.S. Cl.
    CPC .......... *B25F 5/001* (2013.01); *H02H 7/0856* (2013.01)
(58) Field of Classification Search
    CPC ........ B25F 5/001; B25B 23/14; H02H 7/0856
    USPC ........................................ 173/176, 2, 6, 170
    See application file for complete search history.

(56) References Cited

U.S. PATENT DOCUMENTS

| 4,066,133 | A | * | 1/1978 | Voss ...................... B25B 23/147 173/182 |
| 4,448,261 | A | | 5/1984 | Kousek et al. |
| 5,738,177 | A | | 4/1998 | Schell et al. |
| 5,984,020 | A | | 11/1999 | Meyer et al. |
| 6,236,177 | B1 | | 5/2001 | Zick et al. |
| 7,610,970 | B2 | | 11/2009 | Sihler et al. |
| 7,681,659 | B2 | | 3/2010 | Zhang et al. |
| 2001/0042630 | A1 | | 11/2001 | Kristen et al. |
| 2004/0211573 | A1 | | 10/2004 | Carrier et al. |
| 2006/0081386 | A1 | * | 4/2006 | Zhang ................. B23D 59/001 173/2 |
| 2009/0065225 | A1 | * | 3/2009 | Forster .................. B23Q 11/04 173/2 |

FOREIGN PATENT DOCUMENTS

WO    2013045138 A1    4/2013

OTHER PUBLICATIONS

International Search Report and Written Opinion in related International patent application No. PCT/US2016/018497, dated Apr. 21, 2016, 8 pages.

* cited by examiner

*Primary Examiner* — Nathaniel Chukwurah
(74) *Attorney, Agent, or Firm* — Law Office of Jeff Williams; J. Oliver Williams

(57) ABSTRACT

A dynamic arresting mechanism for preventing injury from the torqueing of a rotating tool body. The mechanism including an inertia switch to automatically detect the rotation of the tool body and selectively initiate a dynamic arresting mechanism sequence configured to arrest the motor. The mechanism further including a first relay in communication with the inertia switch, an arresting mechanism configured to brake the rotation of the motor, and a delay mechanism configured to cut off power to the arresting mechanism and motor after a predetermined amount of time has elapsed. The mechanism is reset upon release of the trigger used to operate the rotating tool.

14 Claims, 3 Drawing Sheets

ANTI-TORQUEING DYNAMIC ARRESTING MECHANISM

BACKGROUND

1. Field of the Invention

The present application relates generally to drill devices and, more particularly, to an anti-torqueing arresting mechanism to stop the sudden and undesirable rotation of a tool.

2. Description of Related Art

Rotating hand tools are common place in today's society. Power tools typically employ a motor that imparts a torque to a tool through a spindle and associated gears or chuck. Examples of such devices are rotating drills, rotating screwdrivers, hole saws, grinding wheels, or other abrading tools.

Generally speaking, rotating power tools or hand tools may suddenly experience an impending kickback condition at which time the spindle quickly slows or ceases rotation and the torque of the motor is suddenly passed to the body of the tool. The body then rotates about the axis of the spindle in place of the rotating spindle itself. Such conditions can commonly occur during binding of a bit, the setting of a screw, or during the use of a spade bit for example. Sudden rotation of the tool body can cause injuries to operators.

It is desirable to provide an anti-torqueing arresting mechanism for a rotating hand tool that is simple and effective without the need of complex processing and circuitry. Although great strides have been made, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
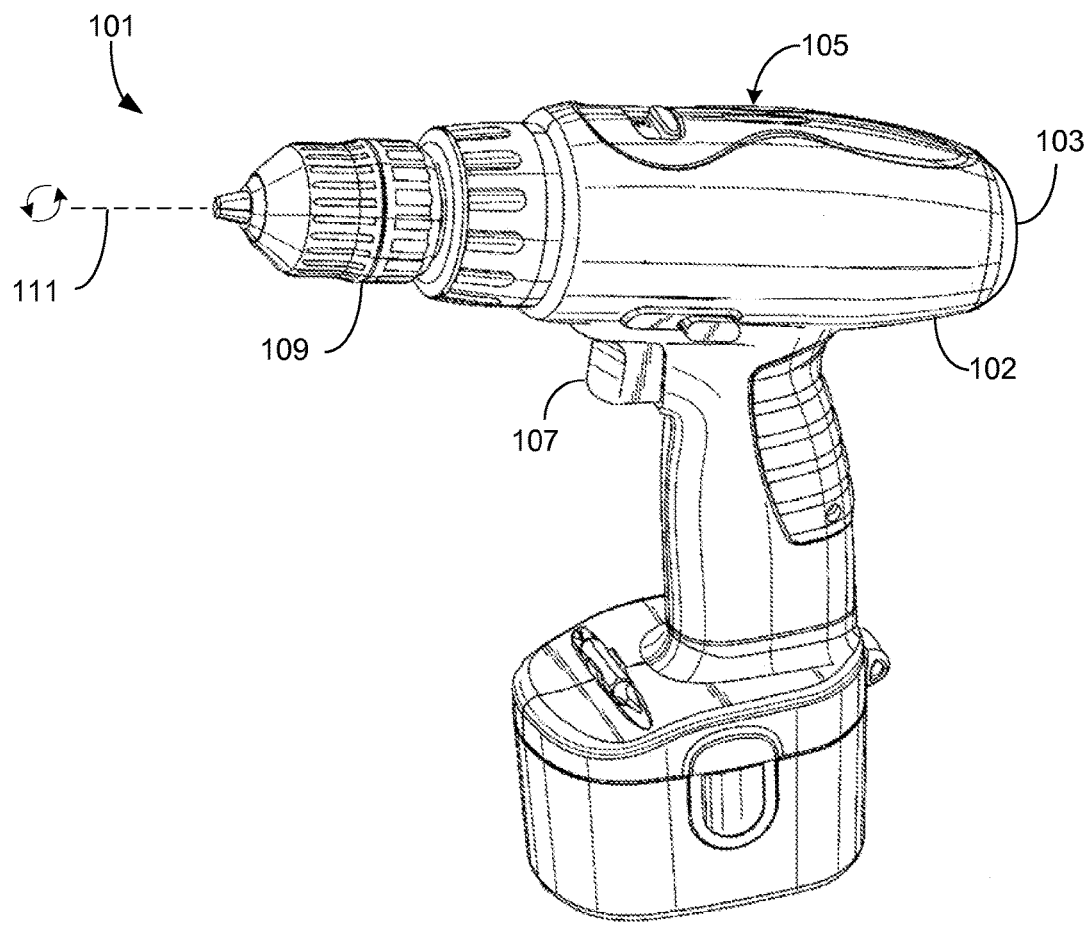
FIG. 1 is a perspective view of a rotating tool having a dynamic arresting mechanism according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The mechanism in accordance with the present application overcomes one or more of the above-discussed problems commonly associated with rotating tools. Specifically, the mechanism of the present application is configured to apply a dynamic brake to the motor of the rotating tool so as to cease rotational movement of the tool body and motor upon a sudden and unexpected transfer of torque from the motor to the tool body itself. Without the cessation of rotational movement of the motor, the torque of the motor is transferred to the tool body wherein the body of the operator is subjected to a potentially extreme twisting motion. Such twisting motions may cause bodily injury. These and other unique features of the system are discussed below and illustrated in the accompanying drawings.

The mechanism will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The anti-torqueing dynamic arresting mechanism of the present application is illustrated in the associated drawings. The mechanism includes an inertia switch configured to detect the rotation of the body of the rotating tool and automatically initiate a dynamic arresting mechanism sequence configured to arrest the motor of the rotating tool. At least one relay is also included for activating one or more contacts associated directly with an arresting mechanism and a delay mechanism. The arresting mechanism is configured to brake the motor of the rotating tool. The delay mechanism is configured to permit sufficient time to the arresting mechanism to brake the motor and then terminate power to the arresting mechanism and motor. Resetting of the mechanism and the associated functioning of the rotating tool is performed by releasing the trigger of the rotating tool.

Referring now to the drawings wherein like reference characters identify corresponding or similar elements in form and function throughout the several views. FIG. 1 illustrates an exemplary rotating tool 105 having the anti-torqueing dynamic arresting mechanism 103 of the present application. The rotating tool 105 and mechanism 103 are combined as a complete system 101. Tool 105 utilizes a motor 106 (see FIG. 2) to impart a torque to perform work. Tool 105 includes a trigger 107 for regulating power to motor 106. Motor 106 includes an armature 108 and at least one coil 104. Motor 106 rotates one or more gears and/or chuck 109 about axis 111. While holding system 101 stationary, tool 105 selectively rotates gears/chuck 109. At a moment when gears/chuck 109 catches or suddenly stops rotating, due to binding or other reason, the torque from motor 106 is transferred to tool body 102 and simultaneously the operator in the form as a kickback condition. Mechanism 103 is configured to automatically detect and stop the rotation of motor 106 when kickback condition is detected. Although tool 105 is illustrated as a drill in FIG. 1, it is understood that tool 105 is not so limited and other rotating tools are contemplated with mechanism 103, such as at least the following: rotating screwdrivers, hole saws, floor buffers, and grinding wheels. Additionally, it is understood that other reciprocating tools may also be combined with mechanism 103 to form system 101.

Figure 2:
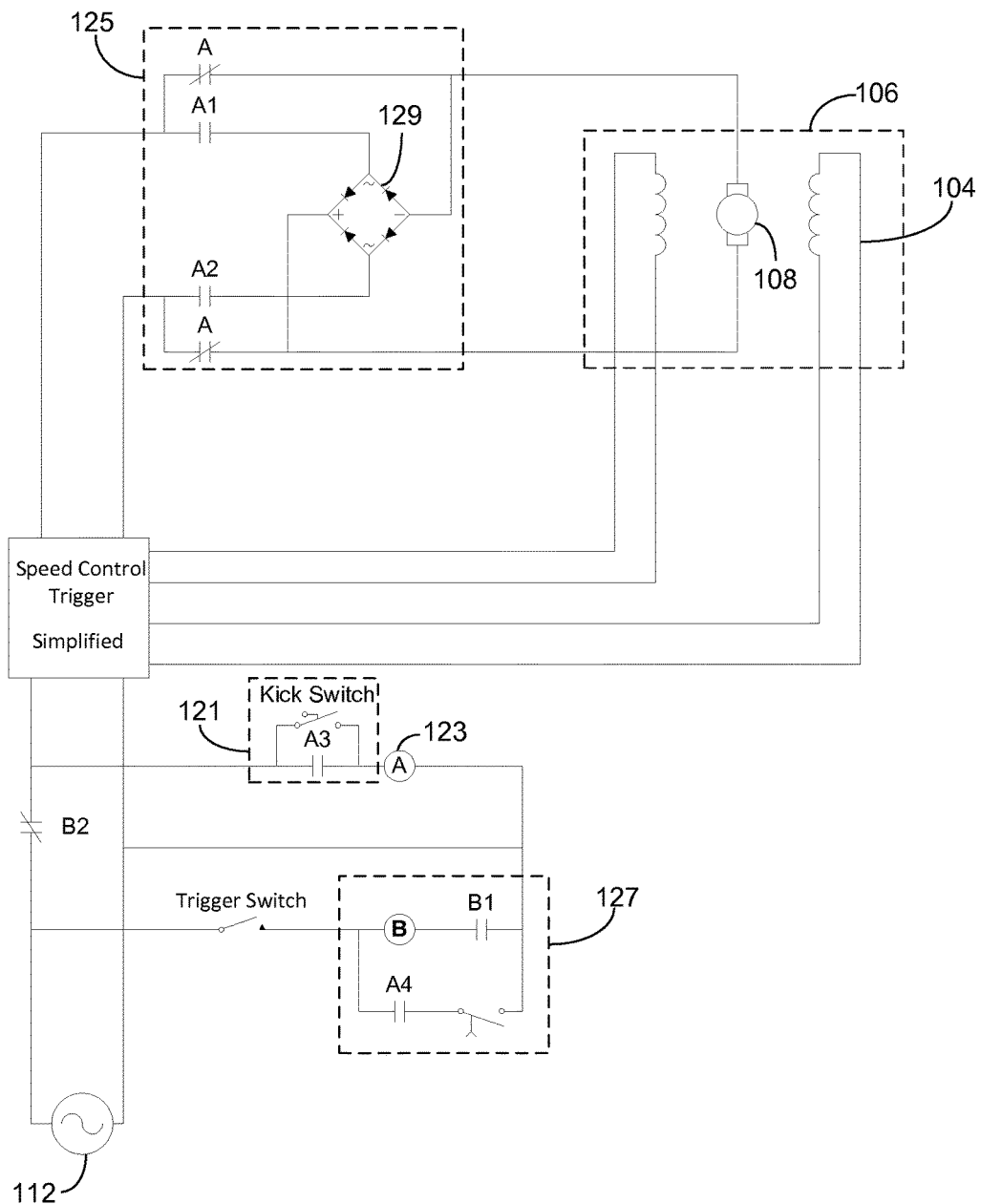
FIG. 2 is a schematic of the dynamic arresting mechanism of FIG. 1 within the rotating tool.

Referring now also to FIG. 2 in the drawings, a schematic of system 101 including the relationship between mechanism 103 and tool 105 is illustrated. Mechanism 103 includes the use of an inertia switch 121 in communication with trigger 107. Switch 121 has an uneven mass distribution wherein the location of mass is distributed so as to allow its angular momentum to be separate from that of body 102. Switch 121 is configured to react to rotational movements of tool body 102 about axis 111. The unequal mass distribution within switch 121 is selected and located so as to provide for a predetermined allowed range and speed of rotation of tool body 102 by the operator prior to activation of switch 121. Upon activation of switch 121, switch 121 is configured to either close a circuit or open a circuit to regulate the flow of current that initiates a dynamic arresting mechanism sequence. The sequence being the steps automatically taken by mechanism 103 to cease rotation of tool body 102 upon the event of a kickback condition.

Mechanism 103 is configured to prevent rotation of tool body 102 within forty-five (45) degrees of rotation from the initial detection of a kickback condition to the cessation of rotation within motor 106. It is understood that mechanism 103 is configured to do more than just cease power to motor 106. By removing power only, motor 106 would still be permitted to rotate as a result of residual energy within itself. Mechanism 103 is configured specifically to brake motor 106 and cease all rotation.

Mechanism 103 further includes a first relay 123 in communication with switch 121. Relay 123 is a type of contactor. Relay 123 can be one of many different forms but in this embodiment serves as a coil. Upon activation of switch 121, current flows to relay 123 which initiates the dynamic arresting sequence. Relay 123 is configured to activate one or more contacts within the circuitry of system 101. As noted in FIG. 2, contacts A1, A2, A3, and A4 are in direct communication with relay 123. Each contact previously listed is normally open during normal operation of tool 105. Contacts A1 and A2 are included within arresting mechanism 125. Contact A3 is associated with switch 121 and relay 123, while contact A4 is associated with delay mechanism 127. Once relay 123 is activated, contact A3 closes and locks relay 123 in position and power is directed to both arresting mechanism 125 and delay mechanism 127. Contacts A1 and A2 automatically closed.

Arresting mechanism 125 and delay mechanism 127 are also included within mechanism 103. Arresting mechanism 125 is in communication with one or more of the contacts (i.e. A1 and A2) and further includes a full wave bridge 129. Upon activation of relay 123, contacts A1 and A2 are instantaneously closed, thereby applying alternating current to the full wave bridge's terminals. As a result of applying an alternating current to bridge 129 terminals, a direct current is applied from bridge 129 to armature 108. This direct current acts to create a brake on motor 106. It is understood that mechanism 103 and system 101 may be operated with a power source 112 that provides either alternating current or direct current. Depending on the type of current of power source 112, mechanism 103 is accordingly modified to operate in accordance with the present description. For example, bridge 125 may be replaced with to accommodate the different type of current. For purposes herein, the description is provided assuming the use of an alternating current.

Delay mechanism 127 is also in communication with relay 123 and receives current when switch 121 is activated, similar to that of arresting mechanism 125. Delay mechanism 127 is configured to automatically cut off power to arresting mechanism 125 and trigger switch 107 when initiated after a predetermined time delay. When switch 121 is activated, contact A4 closes thereby allowing current to flow through the triac delay circuit (such circuit may be replaced if DC power source used). Delay mechanism 127 further includes contactor B and contact B1. The use of a time delay allows arresting mechanism 125 the time to fully brake motor 106. As previously stated, if arresting mechanism 125 and delay mechanism 127 were simultaneously operated then arresting mechanism 125 may not be permitted sufficient time to brake motor 106. Therefore the use of a delay is required. A permitted delay prior to activation of contactor B and contact B1 is 0.1 to 0.2 seconds. After the delay, the current flows through contactor B and contact B1. Contact B1 closes and is configured to lock contactor B1 in a prescribed position. Contact B2 therein receives current from contactor B and opens, thereby removing the supply of power to motor 106 and arresting mechanism 125.

System 101 is configured to reset when trigger 107 is released. Upon release of trigger 107, contactor B is reset and power and mechanism 103 is returned to an initial starting position. Contact B2 closes allowing current (i.e. alternating current) to flow to trigger 107.

Figure 3:
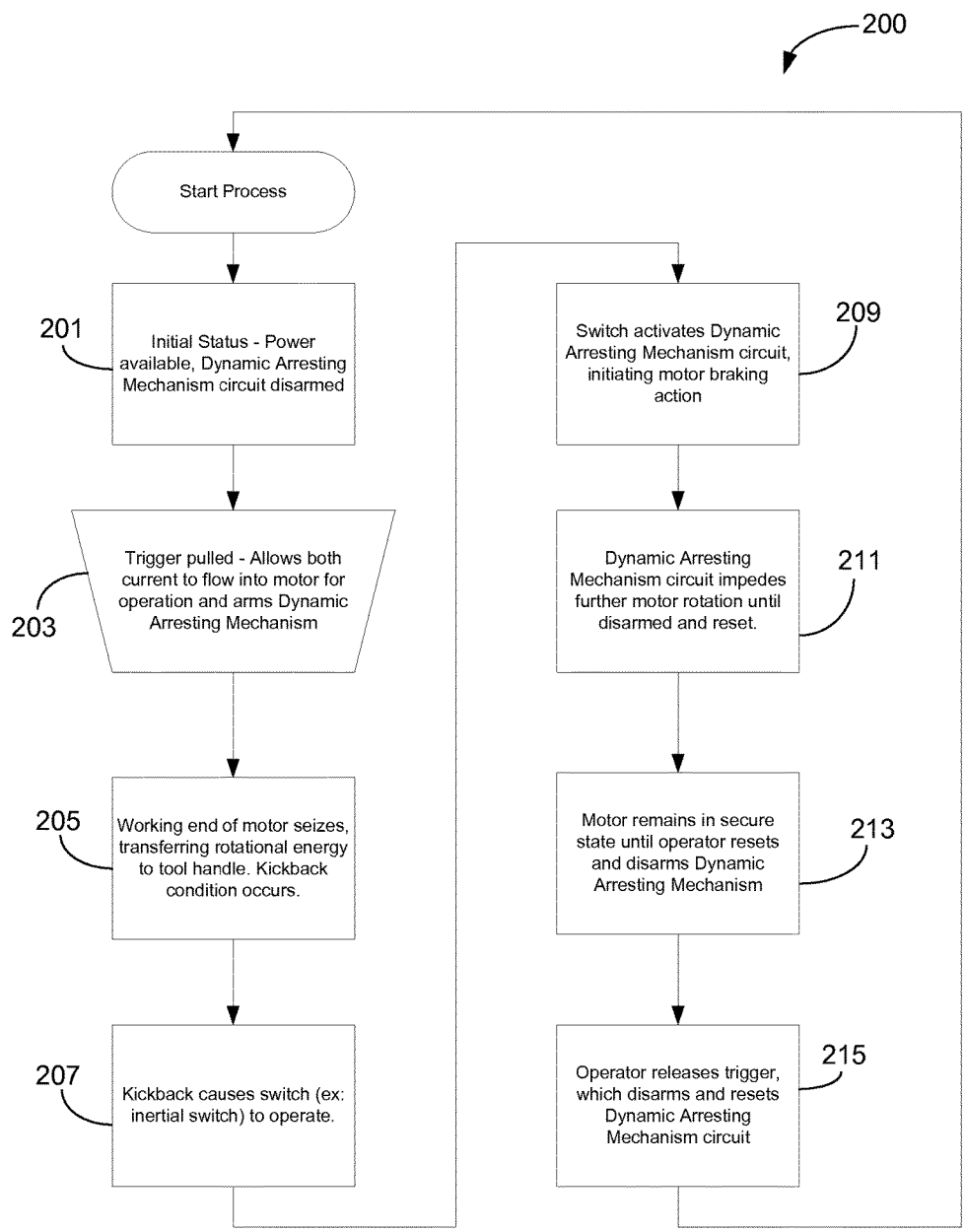
FIG. 3 is a chart of the sequence of steps followed by the dynamic arresting mechanism of FIG. 1.

Referring now also to FIG. 3 in the drawings, a chart 200 showing the sequence of steps of used within system 101 to cancel the transfer of torque to an operator during a kickback condition is illustrated. Initially the system of the present application is powered and operable by an operator 201. Upon activation of the trigger 203, the motor rotates. In the event that the end of the rotating tool seizes, a kickback condition can occur 205. Not all seizures of the rotating tool are sufficient to cause a chance of injury to the operator. An inertial switch is used to selectively activate the anti-torqueing mechanism when the level of torque and speed of rotation of the tool body are exceeding a predetermined threshold 207. At such time, a relay is activated and locked in position to pass current 209 to an arresting mechanism to initiate motor braking. Additionally, current is passed through a delay mechanism, delayed from initiation by a predetermined amount of time, to impede or cease the flow of power 211 to the motor and arresting mechanism. In this condition, the motor remains stationary and without power 213. By releasing the trigger, the system is reset and power is available for rotation of the motor 215.

The current application has many advantages over the prior art including at least the following: (1) application of current to brake the motor; (2) time delayed response to cutting power to the motor to allow for the motor brake to be applied; (3) unnecessary to use processors; (4) mechanical mechanism applied automatically; and (5) operable with both AC and DC power supplied rotary tools.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A dynamic arresting mechanism for preventing injury from the torqueing of a rotating tool having a body, a motor, and a trigger, comprising:
   an inertia switch configured to detect the rotation of the body and automatically initiate a dynamic arresting mechanism sequence configured to arrest the motor, the inertia switch in selective communication with a power source through the trigger;
   a first relay in communication with the inertia switch and configured to activate one or more contacts;
   an arresting mechanism in communication with the first relay and including the one or more relay contacts, the arresting mechanism configured to brake the rotation of the motor; and
   a delay mechanism in communication with the first relay and configured to cease power to the motor and the arresting mechanism, the delay mechanism includes one or more delay contacts and a coil.

2. The dynamic arresting mechanism of claim 1, wherein the dynamic arresting mechanism sequence includes routing current through one or more contactors and the one or more contacts so as to cease the rotation of the motor.

3. The dynamic arresting mechanism of claim 1, wherein detection of the rotation of the body is performed by unevenly distributing mass within the inertia switch.

4. The dynamic arresting mechanism of claim 3, wherein the inertia switch is triggered when the speed of rotation of the body exceeds a prescribed level and rotates beyond a prescribed radial distance.

5. The dynamic arresting mechanism of claim 4, wherein the prescribed radial distance is 45 degrees.

6. The dynamic arresting mechanism of claim 4, wherein triggering the inertia switch includes breaking contact within a circuit to stop the flow of current.

7. The dynamic arresting mechanism of claim 4, wherein triggering the inertia switch includes making contact within a circuit to permit the flow of current.

8. The dynamic arresting mechanism of claim 1, wherein a current from the power source is at least one of alternating current and direct current.

9. The dynamic arresting mechanism of claim 1, wherein the arresting mechanism includes a full wave bridge, a first and second relay contact in communication with the terminals of the full wave bridge.

10. The dynamic arresting mechanism of claim 9, wherein a direct current is applied from the full wave bridge to an armature in the motor.

11. The dynamic arresting mechanism of claim 1, wherein the delay mechanism is configured to delay the cessation of power to the arresting mechanism and the motor.

12. The dynamic arresting mechanism of claim 11, wherein the delay time is no more than 0.2 seconds.

13. The dynamic arresting mechanism of claim 1, wherein the arresting mechanism sequence is reset upon the release of the trigger.

14. The dynamic arresting mechanism of claim 1, wherein the rotating tool is an electric drill, a rotating screwdriver, a hole saw, a grinding wheel, or reciprocating tool.

* * * * *